United States Patent [19]

Streichert

[11] Patent Number: 6,058,358
[45] Date of Patent: May 2, 2000

[54] DEVICE FOR DIRECTION OF ROTATION RECOGNITION AND PLAUSIBILITY TESTING IN ABSOLUTE ANGULAR POSITION MEASURING DEVICES ESPECIALLY WITH SERIAL TRANSMISSION OF ACTUAL POSITIONS DETECTED

[75] Inventor: Gerhard Streichert, Postbauer-Heng, Germany

[73] Assignee: Siemens Aktiengesellschaft, Munich, Germany

[21] Appl. No.: 08/930,716
[22] PCT Filed: Mar. 25, 1996
[86] PCT No.: PCT/DE96/00520
§ 371 Date: Jan. 5, 1998
§ 102(e) Date: Jan. 5, 1998
[87] PCT Pub. No.: WO96/30723
PCT Pub. Date: Oct. 3, 1996

[30] Foreign Application Priority Data

Mar. 30, 1995 [DE] Germany ............. 295 05 426 U

[51] Int. Cl.[7] ............. G01D 5/244; G01D 3/08; G01B 21/22
[52] U.S. Cl. ............. 702/151; 324/165; 324/207.12; 324/207.25; 340/672; 341/6; 702/92
[58] Field of Search ............. 324/160, 165, 324/166, 207.12, 207.25; 250/231.13, 231.14, 231.17, 231.18; 341/6, 13–15; 318/648, 661, 799; 340/671, 672; 702/92, 94, 145, 150, 151

[56] References Cited

U.S. PATENT DOCUMENTS 4,506,339  3/1985  Kuhnlein ............. 324/165 X

FOREIGN PATENT DOCUMENTS

| 0 479 525 | 4/1992 | European Pat. Off. . |
| 276 541 | 2/1990 | German Dem. Rep. . |
| 149 263 | 7/1981 | Germany . |
| 6258098 | 9/1994 | Japan . |

*Primary Examiner*—Gerard Strecker
*Attorney, Agent, or Firm*—Kenyon & Kenyon

[57] ABSTRACT

A first value (V), which corresponds to the angular units covered during two actual position values successively transmitted via the data transmission link at the maximum rotational speed of the encoder shaft (W), and a second value (D) which corresponds to the difference between the maximum travel of the angular position encoder (MAX) and the first value (V), are stored in a store. A processing unit determines the direction of rotation of the shaft (W) depending on whether two actual position values (X11, X12; X21, X22; X31, X32) lie in the range between the zero point (NP) of the angular position encoder and an actual position value (L2) corresponding to the magnitude of the first stored value (V), or in the range between an actual position value (L1) corresponding to the magnitude of the second stored value (D) and the maximum travel (MAX), or outside these ranges. The invention has the advantage that, in spite of the possible occurrence of unexpected or fault-induced large changes in magnitude in the detected actual angular position values, the direction of rotation of the shaft of the angular position encoder can be ascertained correctly in each case.

4 Claims, 2 Drawing Sheets

DEVICE FOR DIRECTION OF ROTATION RECOGNITION AND PLAUSIBILITY TESTING IN ABSOLUTE ANGULAR POSITION MEASURING DEVICES ESPECIALLY WITH SERIAL TRANSMISSION OF ACTUAL POSITIONS DETECTED

FIELD OF THE INVENTION

The present invention relates to absolute angular position encoders, particularly to a device for determining the direction of rotation of said encoders and the plausibility of detected position values.

BACKGROUND INFORMATION

In absolute angular position encoders, actual position values can be transmitted, preferably serially, for example to a controller for further processing, in binary form at predefined time intervals. Since the operation of serial data transmission of all the bits of an actual value of this type that is encoded in binary form takes up a specific time duratio, the real actual value can vary sharply during said operation of the serial data transmission.

A first case of this type is presented when the shaft of the absolute angular position encoder temporarily rotates at a high rotational speed. It may occur, for example, because of an excessive speed that is intrinsically inadmissible. In such case, the factual position of the shaft may change by many distance units between the beginning and end of the serial, bitwise transmission of an actual position value that was detected previously. The subsequent, serially transmitted actual position value then has an absolute magnitude which has changed in an unexpectedly abrupt manner.

A further case of this type is presented when errors occur during the serial data transmission. In this case, high-value bits in the encoding of the actual position value can be falsified in the serial data stream. Such occurrence, for example, may be caused by electromagnetic irradiation. In such case, actual position values may have an absolute magnitude which, induced by the error, changes in an abrupt manner. If such abrupt changes in an actual angular position value are fed to a controller, for example, then both the identification of the rotational direction of the shaft of the angular position encoder, and the testing of the plausibility of the incoming actual position values, are made more difficult.

In normal operation, the direction of rotation of the shaft of the angular position encoder can be ascertained in a simple manner by determining the difference between successive actual values. If the sign of "current actual position value - previous actual position value" is positive, then the rotation is "forward", for example; if a negative sign occurs, then the rotation is "backward". However, a precondition for the functional capability of this method is that the two actual values in the above difference are always positioned so close to each other that such a pair in each case lies either "before" or "after" the so-called "zero point" of the shaft of the angular position encoder. As such, the absolute magnitudes of the two actual values must generally not deviate sharply from each other.

However, the rotational speed of the shaft, and the rapidness of the serial data transmission, must always be matched to each other in such a way that one of the two values of the pair is not acquired "before" and the other value acquired "after" passing over the zero point. In such a case, an erroneous direction of rotation would be determined. For instance, if the old actual value, lying "before" the zero point, is 3550, (corresponding for example to an actual position value of 355.0 degrees), and the new actual value, lying "after" the zero point, is 50 (corresponding for example to an actual position value of 5.0 degrees), then, the difference "current actual position value—previous actual position value", i.e. 50–3550, results in a negative sign. This occurs even though the shaft has been rotated forward over the zero point. On the other hand, actual position values which have been severely corrupted in terms of magnitude as a result of electromagnetic irradiation must also not be used for the difference formation. There is the risk in this case, that an erroneous rotational direction will be determined.

Actual position values which have changed sharply in an unexpected or error-induced manner also constitute a problem if these are checked for plausibility, for example in a controller. To this end, it is generally assumed that the change in the incoming actual position values takes place in an approximately quasi-continuous manner. It is then possible to check whether their absolute magnitude exceeds a predefined, maximum admissible rate of change. By this means, actual position values that are unusable, for example falsified because of errors during the serial data transmission, can be filtered out. On the other hand, such large jumps in the actual value can also occur unexpectedly when the matching between the speed of the serial data transmission and the rotational speed of the shaft of the angular position encoder is disturbed. This may occur as a result of a temporary, intrinsically inadmissible, excessive speed of rotation. Such large, faulty or unexpected jumps in the actual value can then be confused with admissible jumps in the actual value, which always occur during the acquisition of the angular position.

During the acquisition of the position of the shaft, the actual value specifically changes from the maximum value to the starting value or zero value, or vice versa, at the moment of traveling over the so-called zero point. With an encoder having, for example, a 0.1° resolution of a complete revolution of the shaft being monitored, the binary coding of the actual value changes from a maximum value of 3599 (corresponding, for example, to an actual position value of 359.9 degrees) to 0 (corresponding, for example, to an actual position value of 0 degrees) when traveling over the zero point. Such jumps in the absolute magnitude of the actual position value are admissible only at the moment of passing over the zero point and must be identified as such. If, however, as described above, sporadically unexpected or error-induced large jumps in absolute magnitude occur, both the identification of the rotational direction of the shaft and the testing of the plausibility of incoming actual position values are hampered by this, for example in a controller carrying out the evaluation.

European Patent Application No. 0 479 525 A2 describes an absolute angular position encoder. In the event of a power failure of the external voltage supply, this supply is buffered by an internal voltage supply. The absolute angle of a rotating element is calculated using the output signals from two detecting coils that are arranged at an angle of 90 degrees to each other. The rotational direction is calculated by comparing the two output signals from the detecting coils. If a transition occurs in one output signal from 'low' to 'high', then the status of the second output signal is checked. Depending on whether the latter is 'low' or 'high', there is positive or negative rotational motion.

Japanese Patent Application No. 6 258 098 relates to an absolute angular position encoder, in which the absolute angular value, which is initially present in binary form, is output serially. For the purpose of angular measurement, use is made in particular of a single revolution counter and a multiple revolution counter.

SUMMARY OF THE INVENTION

An object of the present invention is to provide a device for identifying a direction of rotation of an absolute angular position encoder. The device according to the present invention can reliably determine the direction of rotation and check the plausibility of the detected angular position values of the encoder, in spite of the occurrence of large changes in the absolute magnitude of the detected angular position values.

The device according to the present invention receives actual position values via a serial data transmission link. The circuit includes a storage circuit and a processing unit. The storage device stores a first value that corresponds to the angular units covered in the time between the succesive transmittal of two actual position values via the data transmission link at the maximum rotational speed of the encoder shaft. The storage device further stores a second value corresponding to a difference between the maximum angular travel of the angular position encoder and the first value.

The processing unit of the device according to the present invention determines the rotational direction of the encoder shaft depending on whether the two successively transmitted actual position values lie 1) within the range between the zero point of the angular position encoder and an actual position value corresponding to the magnitude of the first stored value, 2) within the range between an actual position value corresponding to the magnitude of the second stored value and the maximum travel, or 3) outside of the first two ranges.

DETAILED DESCRIPTION

Figure 1:
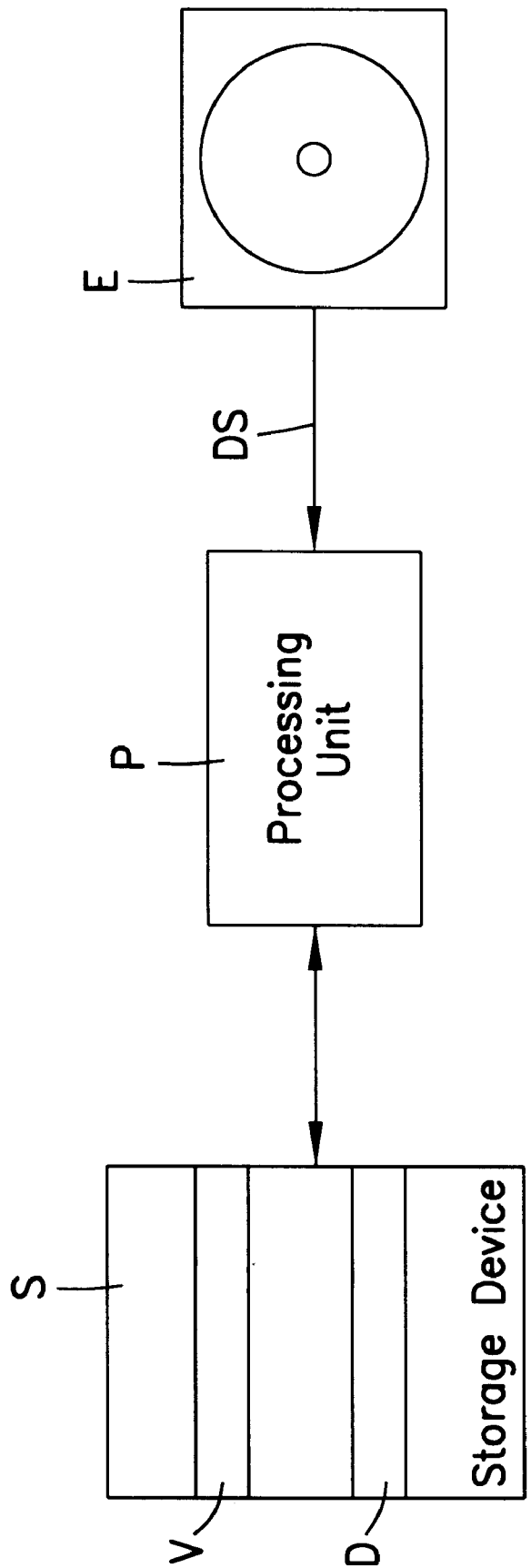
FIG. 1 shows an embodiment of a device according to the present invention.

FIG. 1 shows an embodiment of a device according to the present invention. The device receives actual position values via a serial data transmission link DS from an absolute angular position encoder E. The device includes a storage device S and a processing unit P. The storage device S stores a first value V and a second value D.

Figure 2:
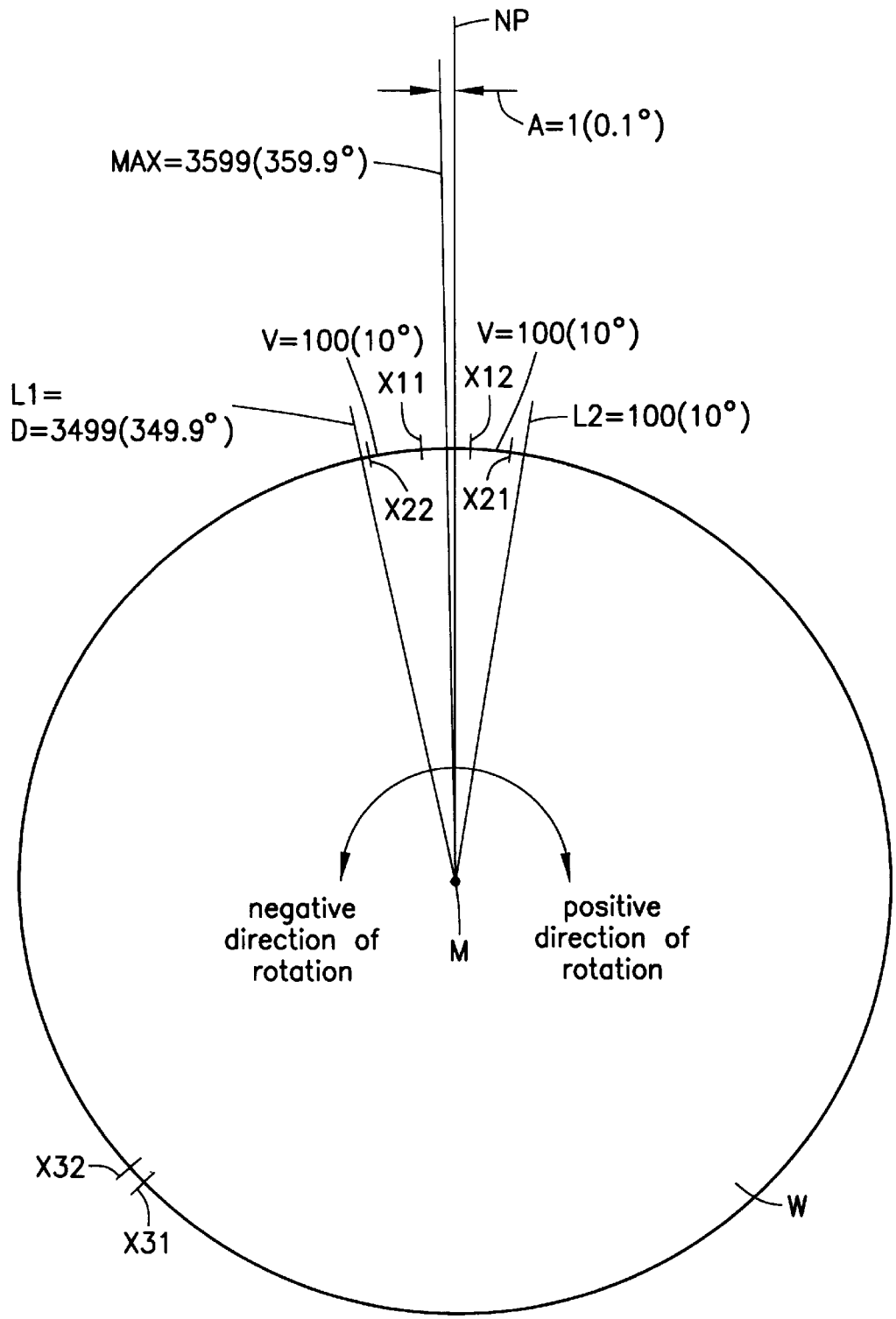
FIG. 2 shows a cross section through a shaft of an angular position encoder.

In FIG. 2, the first value V is first ascertained by the device according to the present invention during, for example, the initialization of the actual position encoder, and stored in a storage device. The first value V corresponds to the number of angular units which are covered in a time interval between two successive transmissions of actual angular position values over the respective serial data transmission link when the maximum admissible rotational speed of the shaft of the angular position encoder is present. The first value V is thus a measure of the capacity of the serial data transmission device in relation to the largest possible rate of change of the actual position values to be acquired and to be transmitted. The first value V corresponds to the largest possible angular distance between two successively acquired and transmitted actual position values. Since in the normal case the rotational speed of the shaft will be lower than the maximum value, actual position values will normally lie closer to one another. Consequently, the first value V represents the current acquisition speed of successive actual position values. In addition, the value V represents the maximum value possible, in this case, of the step height in the absolute magnitude of the actual values.

Furthermore, a second value D is determined by the device according to the present invention. If appropriate the second value D can also be stored in the storage device together with the first value V. The second value D corresponds to the difference between the maximum distance MAX of the angular position encoder and the first value V, i.e. D=(MAX−V).

The second value D corresponds to the position of the value of the shaft of the angular position encoder, whose acquisition and serial transmission, for example to a controller, given the maximum rotational speed of the shaft, would occupy precisely so much time that the subsequently detected actual position value would coincide with the encoder final value MAX. The encoder's final value is the actual position value to which, also depending on the respective binary encoding, the maximum occurring absolute magnitude is assigned. As a rule, the final value lies before the zero point of the encoder only by an angular value that corresponds to the resolution of the angular position encoder.

As shown in the figure, assume that the angular position encoder can acquire position changes of its shaft W with a resolution of 0.1°. It is then advantageous if the smallest absolute magnitude A=1 is assigned to this smallest measurable angular range. Given a resolution of 0.1°, the maximum actual position value that can be acquired has the magnitude of 359.9 degrees. This final value, lying directly before the zero point NP of the shaft W of the angular position encoder, is then assigned the maximum absolute magnitude of MAX=3599. Assume further that the shaft W of the angular position encoder, given the maximum admissible rotational speed, rotates further by an angular range of 10° between the acquisition and transmission of two successive actual position values. In this case, the magnitude 100 results for the first value V (V=10° divided by 0.1°), and D=MAX minus V=3599−100=3499 results for the second value D. In the figure, the actual position values L1 and L2 are illustrated to the right and left of the zero point NP of the shaft W. The actual position value L1=3499 in this case lies by the magnitude of the first value V (100) plus the resolution A (1), i.e., precisely by the magnitude of the second value D, "before" the zero point NP. The second actual position value L2=100 lies "after" the zero point by the magnitude of the first value V (100).

The device according to the present invention can ascertain, via a processing unit and with the aid of the two values V and D, whether a currently detected actual position value and the associated actual position value—which was acquired in the immediately preceding cycle, has been transmitted and is already located in the storage device—are located immediately to the left or right of the zero point NP. In such a case, the actual position values to be brought into conjunction with each other to identify the direction of rotation are exceptionally not both located together on one side of the zero point. Consequently, the actual values are compared with the respective magnitudes of the two stored values V and D with the aid of comparison means of the device according to the present invention.

The present invention will be described further with reference to the FIG. 2 using the example of three pairs of associated actual position values X11/X12, X21/X22 and X31/X32. The values Xn2 represent, respectively, the current, newly acquired and transmitted actual position value, and the values Xn1 represent, respectively, the preceding actual position value acquired in the previous cycle, where n is 1, 2 or 3, respectively.

If, in a first case, it is determined that a current actual position value X12 lies between the zero point NP and the actual position value L2 corresponding to the magnitude of the first value V (i.e. to the right of the zero point in FIG. 2) and if in addition, the previous actual position value X11 lies-between the actual position value L1 corresponding to the magnitude of the second value D and the rotary encoder final value MAX (i.e. to the left of the zero point in FIG. 2) so that the following conditions are satisfied:

NP<X12<V (Eq. 1), and

D<X11<MAX (Eq. 2), then the device according to the present invention ascertains a positive rotational direction.

If, in a second case, the comparison yields the result that a current actual position value X22 lies between the actual position value L1 corresponding to the magnitude of the second value D and the rotary encoder final value MAX (i.e. to the left of the zero point in FIG. 2) and if in addition, the previous actual position value X21 lies between the zero point NP and the actual position value L2 corresponding to the magnitude of the first value V (i.e. to the right of the zero point in FIG. 2) so that the following conditions are satisfied:

D<X22<MAX (Eq. 3), and

NP<X21<V (Eq. 4), then the device according to the present invention ascertains a negative direction of rotation.

If one of the two conditions in one of the above pairs of equations Eq.1, Eq.2, or Eq.3, Eq.4 is satisfied, then the zero point NP of the shaft W of the angular position encoder has been passed over, and the two values to be processed in relation to each other to acquire the current rotational direction do not position together as a pair on one side of the zero point NP.

If, in a third case, the comparison yields the result that none of the conditions in the above equations Eq.1 to Eq.4 is satisfied, then the two actual position values do not lie close to or about the zero point NP. One pair of such actual position values X32, X31 is drawn in FIG. 2. The difference between the current actual position value X32 and the previous actual position value X31 is then formed as previously. If the sign of this difference is positive, then the rotational direction is positive, otherwise it is negative. As shown in FIG. 2, the rotational direction is positive.

An advantage of the present invention is that, despite the possible occurrence of unexpected or error-induced large changes in absolute magnitude in the detected actual angular position values, the rotational direction of the shaft can be ascertained correctly in each case. The present invention has the further advantage that it can be easily expanded to include an additional plausibility test of acquired actual position values.

Therefore, the magnitude of the difference "current actual position value—previous actual position value" is formed. If this magnitude is greater than the first value V, then one of the two actual values is erroneous, since the values on the circumference of the shaft then, lie too far apart from each other. A magnitude of this amount can only occur if either the factual rotational speed is higher than the maximum admissible speed, or an actual position value has been corrupted, for example as a result of electromagnetic irradiation during the serial data transmission. If such an erroneous pair of position values occurs, then it cannot be processed further, but must be discarded. This supplement to the present invention has the advantage that the actual position values transmitted can be checked for plausibility even if no data-securing methods, for example, adding redundant items of information such as parity or check sum bits, are used during the serial data transmission.

I claim:

1. A device for identifying a direction of rotation of an absolute angular position encoder, the device receiving actual position values via a serial data transmission link, comprising:

a storage device, the storage device storing:

a first value corresponding to angular units covered in a time interval between successive transmittals of two actual position values via the data transmission link at a maximum rotational speed of an encoder shaft, and a second value corresponding to a difference between a maximum angular distance of the angular position encoder and the first value; and a processing unit coupled to the storage device, the processing unit determining the direction of rotation of the encoder shaft as a function of whether at least one of the two successively transmitted position values lies in at least one of:

a first range between a zero point of the angular position encoder and a first actual position value, the first actual position value corresponding to the first value, a second range between a second actual position value and the maximum angular distance, the second actual position value corresponding to the second value, and a third range outside of the first range and the second range.

2. The device according to claim 1, wherein the processing unit:

detects a positive rotational direction if a current actual position value lies in the first range, and if a previous actual position value lies in the second range, and detects a negative rotational direction if the current actual position value lies in the second range, and if the previous actual position value lies in the first range.

3. The device according to claim 2, wherein the processing unit detects the rotational direction by calculating a difference between the current actual position value and the previous actual position value if at most one of the current actual position value and the previous actual position value lies in one of the first range and the second range.

4. The device according to claim 1, wherein the processing unit forms an absolute magnitude of a difference between the current actual position value and the previous actual position value, the processing unit discarding the current actual position value and the previous actual position value as lacking plausibility if a value of the absolute magnitude is greater than the first value.

* * * * *